United States Patent [19]

Sali et al.

[11] Patent Number: 4,768,715

[45] Date of Patent: Sep. 6, 1988

[54] VEHICLE MOUNTABLE LIQUID SPRAY SYSTEM

[76] Inventors: Brian Sali, 1111 Deeringhoff; Kenneth J. Perrault, Rte. 1, Box 99; Charles J. Perrault, Rte. 1, Box 99A, all of Moxee City, Wash. 98936

[21] Appl. No.: 30,053

[22] Filed: Mar. 24, 1987

[51] Int. Cl.⁴ .............................................. B05B 1/20
[52] U.S. Cl. .................................... 239/166; 239/172; 172/466
[58] Field of Search ............... 239/150, 159, 161–164, 239/166–169, 172, 1, 597; 47/1.7; 172/310, 311, 417, 466, 484, 662

[56] References Cited

U.S. PATENT DOCUMENTS

| | | | |
|---|---|---|---|
| 2,356,030 | 8/1944 | Byers . | |
| 2,574,206 | 11/1951 | Browning | 239/162 X |
| 2,575,521 | 11/1951 | Ireland . | |
| 2,593,176 | 4/1952 | Patterson | 172/466 X |
| 3,085,754 | 4/1963 | Thompson . | |
| 3,358,777 | 12/1967 | Groenke | 172/417 |
| 3,830,014 | 8/1974 | Baker | 47/1.7 |
| 3,830,311 | 8/1974 | Bryson | 172/417 X |
| 3,917,167 | 11/1975 | Pearce et al. | 239/159 X |
| 4,011,994 | 3/1977 | Lenz | 239/168 X |
| 4,178,005 | 12/1979 | Kent, Jr. | 172/417 X |
| 4,441,655 | 4/1984 | Blumhardt | 239/163 |
| 4,586,287 | 5/1986 | Bleasdale et al. | 47/1.7 |
| 4,588,128 | 5/1986 | Broyhill et al. | 239/168 |
| 4,660,654 | 4/1987 | Wiebe et al. | 172/466 X |
| 4,673,130 | 6/1987 | Simpson | 239/167 |

FOREIGN PATENT DOCUMENTS 625495 6/1949 United Kingdom ............... 239/162
1598913 9/1981 United Kingdom ............... 239/159

OTHER PUBLICATIONS

Seven photographs of "Okanagan Turbo" sprayer, produced by Okanagan Turbo sprayers of Penticton B.C., Canada, date of origin unknown, but product photographed has been in use in the U.S. for more than one year before filing date of present application.

Primary Examiner—Andres Kashnikow
Assistant Examiner—Mary Beth O. Jones
Attorney, Agent, or Firm—Wells, St. John & Roberts

[57] ABSTRACT

A spray system and method is described for producing a spray pattern that may be used to spray around stationary objects such as tree trunks in a single pass from one side of the object. The system includes an elongated sectioned boom having provisions for carrying a spray head at an outward end at a relatively constant height from the ground surface. Nozzles at the outward boom end are selectively adjustable into a desired spary configuration whereby the pattern produced projects both inward and outward of the boom end. The pattern may be adjusted so that it will extend equally to opposite sides of an object spaced outwardly of the boom end. Provisions are also made for adjusting the spray pattern and for elevationally adjusting the effective height of the nozzles from the ground surface. Other provisions include a break away mechanism that enables pivotal motion of the outward boom end in response to engagement with an object such as a tree trunk as the system is moved forwardly.

14 Claims, 4 Drawing Sheets

4,768,715

VEHICLE MOUNTABLE LIQUID SPRAY SYSTEM

TECHNICAL FIELD

The present invention relates to spraying liquids to opposite sides of a row of objects from one side of the row.

BACKGROUND OF THE INVENTION

Agricultural chemicals such as herbicides, pesticides, fertilizers, etc. are often applied to spraying processes from a vehicle such as a tractor which carries a tank of the liquid for distribution through a number of spray nozzles along a spray boom. Typical spray booms include nozzles directed to spray the liquid toward the ground surface. The nozzles are spaced elevationally from the ground surface by distances calculated to minimize wind drift of the spray droplets and to maximize the ground surface covered by the spray patterns. Nozzle size and operating pressures are factors determining the ground speed requirements for the associated vehicle. A common practice has been to use high pressure and low volume spray nozzles, with a number of the nozzles being used to increase the application rate and, hence, enable higher speeds for the associated tractor. Low volume, high pressure nozzles, however, easily clog and produce such fine droplets of spray that wind drift becomes a serious concern, especially with spot application of herbicide.

Another problem associated with sprayers is realized especially among orchardists who wish to apply herbicides in "kill strips" to opposite sides of tree rows. The sprayed material must be carefully applied to avoid contact with leaves of the orchard trees. Wind drift is therefore a very serious concern. Another concern is the amount of time required to apply the chemicals.

U.S. Pat. No. 4,586,287 to Bleasdale et al. discloses a spraying apparatus with special provisions for directing spray patterns to opposite sides of objects such as tree trunks. The device includes a spray boom that extends outwardly of a supporting vehicle. A rotatable spray head is situated at the boom end. The spray head includes a number of radially extending arms with a spray nozzle at the end of each. The arms are rotatable about a common vertical axis. Elements are included to enable the rotation of the arms responsive to engagement with a stationary object such as a tree trunk.

BRIEF DESCRIPTION OF THE DRAWINGS

A preferred form of the present invention is illustrated in the accompanying drawings, in which.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present system is generally designated in the drawings by the reference character 10. The system 10 is provided to be mounted to a vehicle such as a typical conventional wheel tractor or other appropriate vehicle (not shown) that may be used for transporting the present system 10 in a forward direction over the ground surface.

The system 10 is provided to produce a spray of liquid directed to the ground surface while being moved ahead by the associated vehicle. A spray pattern is produced by the present system to enable uniform application of the liquid to the ground on opposite sides of an object such as a tree trunk 13 in a single pass and from one side of the object as the system is moved by.

The present system 10 is used advantageously in applying herbicides in orchards where it is desirable to produce a "kill strip" of substantially equal distances to opposite sides of a row of trees. Though such use of the present system is advantageous in orchard situations, it is understood that other applications may be envisioned. It is also conceivable that the present system may be effectively used to apply other liquids such as, for example, insecticides, fertilizer, marking paints or dyes, etc. Additionally, though only one system is shown in the drawings, it is conceivable that two could be utilized, extending to opposite sides of a vehicle to facilitate spraying of two tree rows on opposite sides of the vehicle in one pass. In this manner, the ground surface along two adjacent rows of, say, orchard trees could be treated simultaneously.

In general, the present system 10 makes use of an elongated spray boom 16 that is segmented along its length. The spray boom 16 extends from one end 17 mountable to the vehicle. End 17 is mounted to the vehicle by means of a mounting assembly 18. Spray boom 16 extends from the one end 17 to a remote end 19. A spray head 20 is situated at the remote boom end 19. The spray head 20 includes a number of spray nozzles that will be described in greater detail below for producing the spray patterns shown graphically in FIGS. 2 and 7 through 12.

Figures 1, 2:
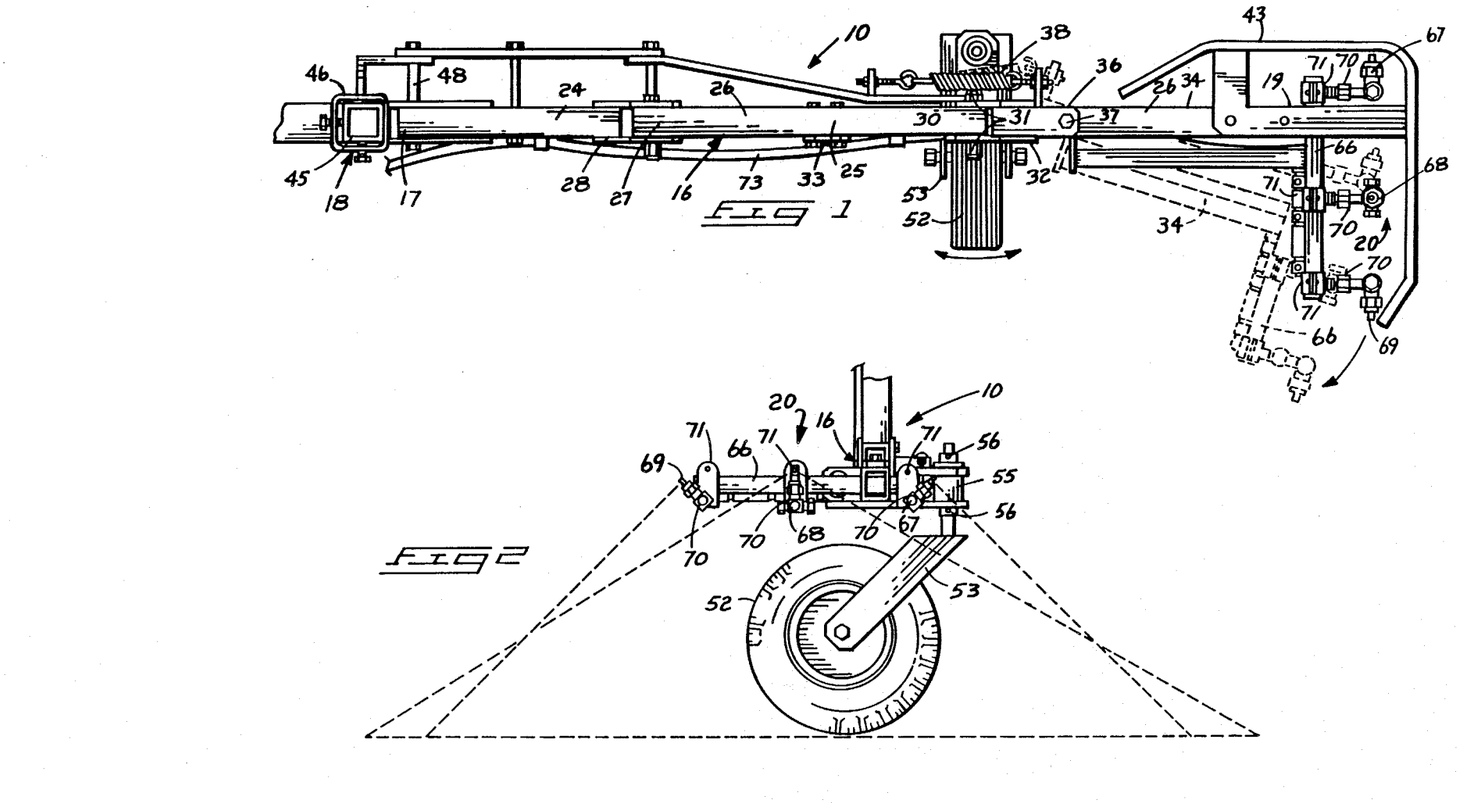
FIG. 1 is a top plan view of the present spray boom and associated components.
FIG. 2 is an end view thereof with portions of the mounting mechanism broken away.
Figure 3:
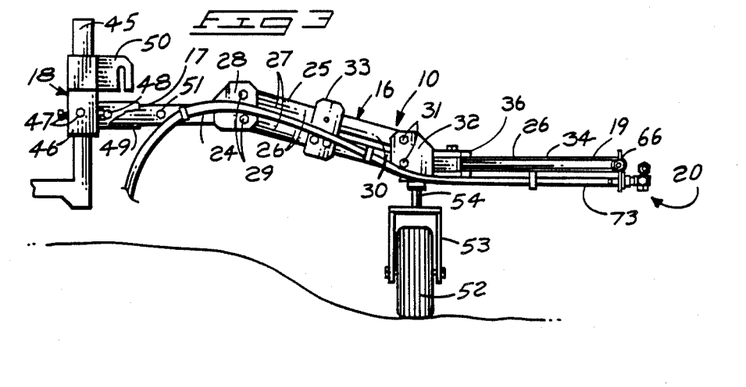
FIG. 3 is an operational elevation view taken on a reduced scale from FIGS. 1 and 2 illustrating the present system in an operative position.
Figure 4:
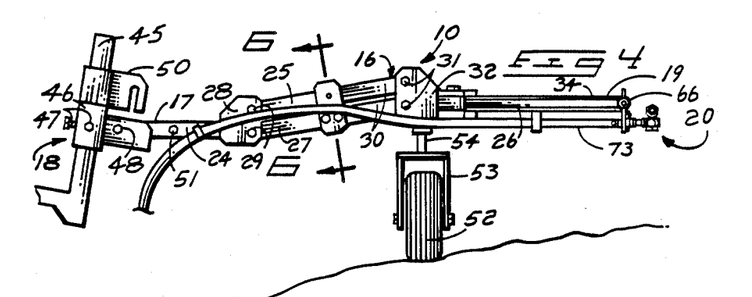
FIG. 4 is a view similar to FIG. 3 only showing a different operational position of the present system.

Details of spray boom 16 may be understood with reference to FIGS. 1, 3, and 4. There it is shown that the spray boom is segmented into three interconnected sections.

A first or inner section 24 extends outwardly from the end 17 and mounting assembly 18. Section 24 as well as much of the remainder of boom 16 may be approximately formed of elongated rigid channel. A bracket 28 is secured to an outward end of section 24.

Spray boom 16 also includes a second section comprised of a parallelogram linkage means 25 that is connected to the first section 24. The parallelogram linkage 25 of the second section is made up of a pair of bars 26 preferably of substantially equal lengths. Inner ends 27 of bars 26 are connected pivotally to the first inner section 24. The bracket 28 mounts the inner bar ends 27 to the inner section 24. Pivot pins 29 extend through the bracket 28 and inner bar ends 27. Pivot pins 29 enable relatively free pivotal motion of the bars about the pin axes. Pivot pins 29 are advantageously parallel to one another and oriented with their axes extending substantially along the intended path of travel for the vehicle.

Bars 26 also include outer ends 30. The outer ends 30 are mounted by pivot pins 31 to an outer bracket 32. Outer bracket 32 is connected to an outer or third boom section 34. The pivot pins 31 are advantageously parallel to one another and to the pivot pins 29. Spacing of the pin groups 29 and 31 is such that a parallelogram may be formed by lines connecting the individual pin axes. The bars 26, along with brackets 28, 32, and pins 29, 31, thus provide a parallelogram linkage interconnecting the inner and outer boom sections 24 and 34 such that two sections may move elevationally relative to one another but will maintain a consistent angular relationships with one another. That is, the parallelogram arrangement will maintain the inner and outer boom sections 24, 34 in parallel planes. This relationship may be understood by comparing FIGS. 3 and 4.

A locking mechanism 33 is provided to secure the bars 36 together. Locking mechanism 33 is shown in substantial detail in FIG. 6. It is advantageously comprised of rigid brackets 39 affixed to one of the bars 26 and extending to opposite sides of the remaining bar 26. Appropriate apertures 40 are provided through the brackets 39 and remaining bar 26. The apertures 40 are positioned to be aligned when the bars 26 are substantially angularly aligned with sections 24, 34. The aligned apertures 40 will slidably receive a locking pin 41. The pin 41 will lock the two bars 26 together and will not permit relative movement of one bar 26 relative to the other along its length. The pin 41 will also prevent the bars 26 from moving toward or away from another as the bars would normally do when functioning in a parallelogram fashion. The brackets 39 and pin 41 will therefore serve to lock the bars and thereby render the entire boom length rigid along its full length from the one end 17 to the remote end 19. This feature is useful when the boom is to be transported in its inoperative transport position (FIG. 5) or when it is desirable to operate the boom in a fixed, extended condition.

The outer or third boom section 34 is advantageously mounted on the boom by means of a breakaway arrangement 36. A pivot pin 37 mounts the outer boom section 34 to facilitate pivotal motion of the outer boom section about a substantially vertical axis. A return spring 38 functions as biasing means for normally urging the boom section 34 toward a normally, outwardly extended position. The normal outwardly extended position is shown by solid lines in FIG. 1 while a deflected orientation of the outer boom section 34 is shown by dashed lines in FIG. 1. The breakaway mechanism 36 is a safety feature to allow deflection of the spray head should a tree trunk or other immovable object be accidently struck as the vehicle is moved along. Once struck, the outward boom section 34 will simply pivot rearwardly, allowing the object to pass. The biasing spring 38 will then return the boom section 34 to the normal outward extended condition once the outward boom end leaves engagement with the stationary object.

A guard 43 is also provided to protect the spray head area of the present system against such engagement with immovable objects. Thus, the guard 43 will strike an object rather than the spray head.

It is noted that the guard 43 is shown in FIG. 1 only and that the remaining figures show the guard removed. This is done to more clearly show the relationship and function of the various other elements of the present system that would otherwise be visually obscured by the guard 43. It should be understood, however, that in typical operation, the guard 43 will advantageously be in position substantially as shown in FIG. 1.

Figure 5:
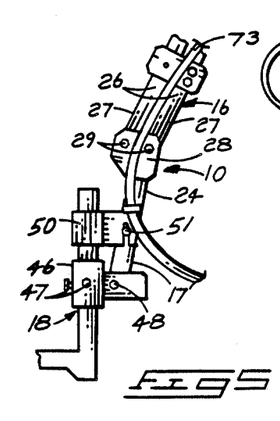
FIG. 5 is a fragmented view illustrating components of the present system in an inoperative, transport condition.
Figure 6:
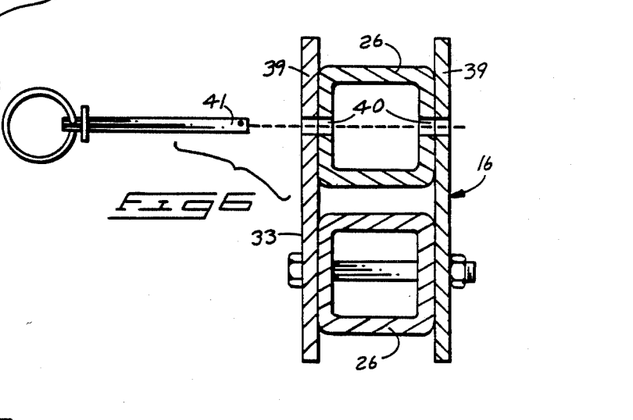
FIG. 6 is an enlarged sectional view taken substantially along line 6—6 in FIG. 4 showing a locking device.
Figure 7:
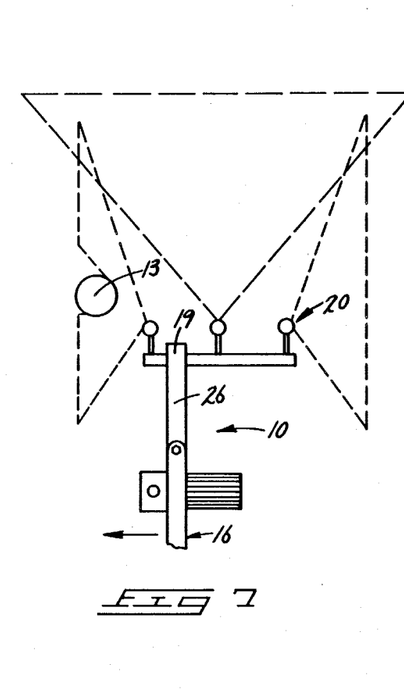
FIGS. 7 through 11 are diagrammatic views illustrating operation of the present system to produce a spray pattern of liquid around an object such as a tree trunk as the system is moved in a forward direction.
Figures 8, 9:
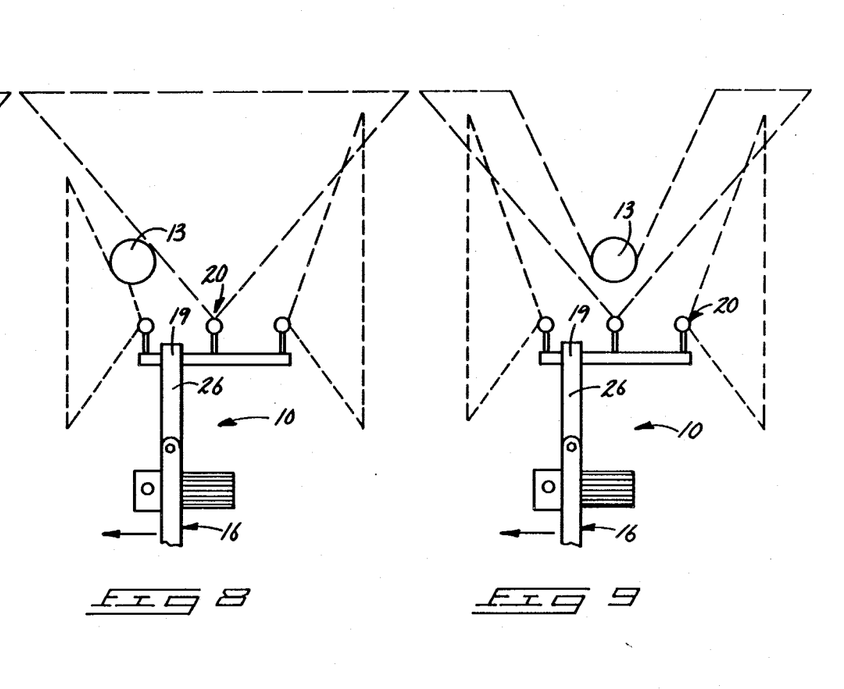
Figure 10:
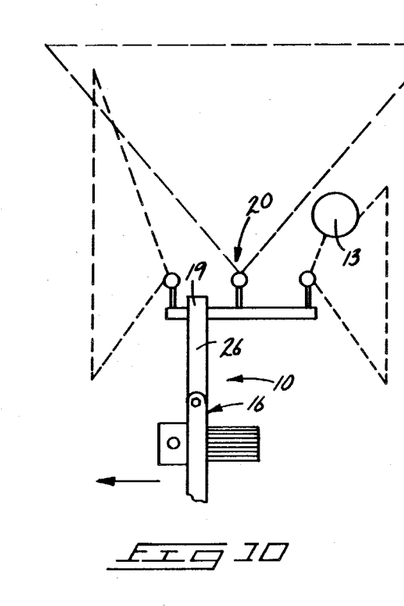

The mounting assembly 18 is shown in substantial detail by FIGS. 3 through 5. Mounting assembly 18 includes a post 45 to be mounted to the tractor or associated vehicle by bolts, clamps, welding or other appropriate conventional fastening device (not shown). It is preferred that the post 45 be mounted along one side of the vehicle and that it be oriented in an upright condition as shown in FIGS. 3 through 6.

The post 45 releasably receives a bracket sleeve 46. Sleeve 46 is slidably received over the post 45 in order to facilitate elevational adjustment of the boom in relation to the ground surface. One or more set screws 47 are advantageously used for this purpose. The set screws 47 extend through the bracket sleeve 46 to forcibly engage the post 45, thereby locking the bracket in an elevational position along the length of the post.

A pivot pin 48 mounts the inner boom end 17 to the bracket sleeve 46. The pivot pin 48 extends through the bracket and adjacent boom end 17 to enable relative pivotal motion between the bracket sleeve 46 and the remainder of the boom. The pin 48 and bracket 46 arrangement enables different angular relationships between the vehicle and the spray boom as indicated in FIGS. 3 and 4. The spray head may thus be maintained at a relatively constant operational height from the ground surface regardless of the vehicle orientation.

FIG. 3 illustrates a stop or abutment surface 49 along a portion of the bracket 46 which is shown with a portion broken away for illustrative purposes. The stop or abutment surface 49 is positioned to receive and support a complementary undersurface of the inner or first boom section 24. The abutting surfaces and the rigid connection between the bracket 46 and post 45 assure that the boom will not drop below a prescribed elevation.

A releasable lock 50 is advantageously provided on the mounting means for releasably securing the spray boom in its upright, inoperative transport position as shown in FIG. 5. The releasable lock 50 is slidably received over the post 45. Lock 50 includes a substantially upright, downwardly open slot for slidably receiving a lug 51 on the first or inner boom section 24. When engaged, the lug and slot cooperate to interconnect the boom section and post 45 and thereby secure the entire boom length in its upright, inoperative transport orientation. The lock 50 can be engaged simply by elevationally sliding the lock 50 along the post in relation to the lug 51 (which is held in alignment with the slot as the lock is being engaged or disengaged). The lock 50 includes the downwardly facing slot to avoid accidental disengagement of the slot and lug during transport. The slot and lug will remain engaged due to gravitational forces, urging the bracket downwardly over the lug.

The lock may remain operative, holding the boom in its upward position, until it is desired to lower the spray boom 16 to its operative substantially horizontal orientation. The spray boom may then be lowered simply by lifting upwardly and inwardly against the boom and by simultaneously lifting the lock 50 upwardly to slidably disengage the lug from the engaged slot. The boom can be freely pivoted down to the operative position once the lug leaves engagement with the slot.

The mounting assembly 18 also includes a wheel 52 that movably supports the boom for movement along the ground surface. A wheel frame 53 rotatably carries the wheel 52. An upright post 54 is provided at a top surface of the wheel frame 53 to be slidably received within a bushing 55. The bushing 55 is mounted on the outer section 34 so that elevational movement of the wheel 52 will automatically result in corresponding elevational movement of the outer boom section 34. Likewise, angular movement of the boom section 34 will result in corresponding angular disposition of the post 54 and wheel 52.

The post 54 is slidably received within bushing 55 and can be selectively adjusted elevationally therein by set screws 56. The set screws 56 function as means for adjusting the spray height above the ground surface, along with adjustments of the bracket sleeve 46 along post 45.

It is important to note the relationship of the wheel 52 and the outer boom section 34. It is significant that the wheel frame 53 is mounted to the outer boom section. With this arrangement, the wheel frame 53 will maintain whatever angular relationship is selected for the outer boom section 34. This relationship is shown in a preferred orientation with respect to the ground surface in FIGS. 3 and 4. Here, the outer boom section 34 is shown substantially horizontal and the wheel is correspondingly vertical. However, the outward boom section 34 may be pivoted by lifting upwardly at the boom end 19 to an angular relationship wherein the outer boom section 34 would be slightly upwardly inclined. The wheel and frame will likewise be inclined due to the rigid angular relationship of the wheel frame 53 to the outer boom section 34. The wheel will be inclined toward the vehicle and will remain in this orientation throughout operation of the spray boom. This is due to the gravitational forces acting against the wheel and reluctance of the wheel to slide laterally over the ground surface to a normal, upright orientation. Thus, the relationship of the outer boom section and wheel facilitates a "quick intermediate" height adjustment should one wish to use such feature temporarily in place of the height adjustment capabilities provided in the bracket sleeve 46 and bushing 55.

The spray head 20 is shown in substantial detail by FIGS. 1 and 2. It is situated at the remote boom end 19. The spray head 20 is advantageously comprised of three individual nozzles connected by a common delivery tube 73 to a source of liquid (not shown) typically carried on the associated vehicle. Liquid is delivered through the tube 73 to all three nozzles simultaneously, though it is understood appropriate valving could be utilized to eliminate one or more of the valves from operation in special circumstances.

The spray head 20 includes a bar 66 that extends substantially transverse in relation to the length of spray boom 16. The bar 66 adjustably mounts the three individual nozzles. A forward nozzle 67 is situated at a forward side of the boom with respect to an intended foward direction of travel. Middle nozzle 68 is situated substantially midway along the length of the bar 66 between forward nozzle 67 and a rear nozzle 69.

The nozzles 67 through 69 are provided with pivot mounts 70 as means for enabling selective angular adjustment of the spray nozzles relative to the spray boom. The nozzles can thus be pivoted to increase or decrease the angular orientation of the spray pattern emitting from each in relation to the ground surface. Further adjustment may be afforded through clamps 71 that mount the nozzles to the bar 66. These clamps can be utilized to selectively adjust the nozzles toward or away from one another along the bar or the nozzles can be pivoted at the clamp mechanism selectively about the axis of the bar 66.

It is advantageous that each nozzle be selected to emit a substantially planar (flat pattern) flow of liquid in a substantially triangular pattern. The spray emitting from each nozzle will therefore strike the ground surface along a straight line of contact as shown in FIGS. 7-12. The plane of each triangular pattern (with respect to the ground surface) may be selectively adjusted by rotating the nozzles on their mounts 70.

The nozzle size is selected preferably to enable high volume, low pressure output. By producing large droplets of liquid and spreading the liquid over a desired distance, a higher application speed may be obtained. Time in the field is thus reduced substantially, as well as the amount of fuel required to complete the spraying operation. It has been found that spray time and fuel may be reduced by approximately 50% over the time required using conventional forms of sprayers.

An important feature of the present invention deals with the particular spray patterns graphically illustrated in FIGS. 7 through 12. The forward nozzle 67 is oriented to spray forward and downwardly to produce patterns shown in FIGS. 7 through 11. The spray is oriented so it will leave the nozzle 67 at an approximate angle of 45° to the horizontal. The resulting coverage along the ground surface will vary depending upon the height of the spray head from the ground surface.

In practice, the height is advantageously between 14 and 18". Of course, a maximum spray pattern will develop if the nozzles are situated at the higher, 18" height. The spray pattern may also be varied substantially by changing the angular orientation of the nozzles to the ground surface. For example, if the nozzles are tipped upwardly, the spray trajectory will increase and, logically, the straight line ground contact where the spray meets the ground surface will coincidentally lengthen. The spray patterns produced by the preferably straight line contact of the spray with the ground surface will reduce to minimal length dimensions as the nozzles are pivoted toward orientations where the spray is substantially vertical.

As briefly mentioned, it is advantageous in orchard use to angle the forward nozzle outward and forwardly by an angle of approximately 45° to the horizontal. This is also true of the rearward nozzle 69.

The front and rear nozzles 67, 69 can be adjusted, by mounts 70, about axes that are substantially parallel to the bar 66. This adjustment has the function of varying the amount of spray directed outwardly beyond the boom end. It is preferable to adjust these nozzles 67, 69 so the boom can be moved past a tree trunk at a safe distance, yet with the ends of the spray patterns being substantially spaced equally to both sides of the tree. Thus, the nozzles 67, 69 are adjusted so the inward ends of the spray patterns are spaced in the same distance inward from the tree trunk as the outward corners of the same spray patterns are spaced outward of the tree trunk.

The middle nozzle 68 is usually directed outwardly in a substantially transverse orientation, overlapping the spray patterns of the forward and rear nozzle 67, 69. This nozzle is utilized to supplement the amount of liquid being deposited at the far outward ends of the spray pattern, and to assure that the spray is projected evenly about the objects, such as the tree trunks shown in the drawings.

Figure 12:
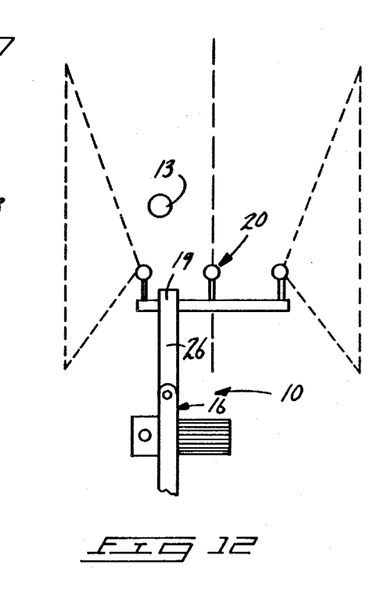
FIG. 12 is an operational view only showing a modified spray pattern.

Middle nozzle 68 may also be pivoted by means of its mount 70 to an orientation substantially as shown in FIG. 12 wherein the spray pattern emitting from the nozzle is substantially vertical. This arrangement, with the remaining front and rearward nozzles, may be utilized in orchard areas where relatively small trees are being sprayed. It may also be utilized for conventional spot spraying.

It is advantageous that the center nozzle 68 be somewhat smaller in discharge capacity than the front and rear nozzles. This helps minimize the amount of spray being applied to the base of trees while still supplementing the amount of spray at the far outward ends of the patterns.

The present method may now be easily understood in conjunction with a description of the operation for the apparatus described above.

Prior to operation, the present boom is attached to the vehicle by first securing the post 45 to the vehicle. This may be done by conventional attachment methods by which the post 45 may be either permanently secured or removably mounted to the associated vehicle frame. It may be preferred to mount the post to the vehicle along one side thereof and between the front and rear wheels (if a wheel tractor is being utilized). Other appropriate mounting arrangements may be used so long as the vehicle operator is able to determine the position of the boom and its outward end.

The spray boom 16 is attached to the upright post by sliding the bracket sleeve 46 over the post 45. Set screws 47 may then be turned to secure the bracket to the post. This is done at a selected height above the ground surface. Corresponding height adjustment for the boom and spray head is accomplished at the wheel bushings 55 through use of the set screws 56. The effective height of the boom is selected according to the desired sprinkler pattern dimensions and the nature of materials being sprayed. Tall weeds, for example, would require that the booms be situated at or near maximum height while operation in a no-weed situation would not require significant elevational spacing.

Once the boom is properly connected, and the delivery tube 73 is attached to an appropriate source of liquid, fine adjustments of the spray nozzles may be set. This is accomplished by selectively tilting the nozzles to vary the angular relationship of the spray patterns with the ground surface and by setting the spray patterns to project outwardly beyond the end of the spray boom. It is advantageous to set the spray patterns so the outwardmost corner of the spray pattern will project to one side of an object such as a tree by a distance equal to the distance from the object to the inside end (toward the vehicle) of the spray pattern. Such a pattern is shown in FIGS. 7-12. The middle nozzle 68 may be adjusted to project its spray pattern transverse to the other two patterns slightly beyond or in close approximation to the outward ends of the other two spray patterns produced by the front nozzle 67 and rearward nozzle 69.

When applying herbicide, the front and rear nozzles 67, 69 should be set to distribute the spray material to determine the edge of the intended kill strip on the vehicle side of the objects to be sprayed around. The middle nozzle 68 must be adjusted so it will spray to the opposite side of the object. The spray pattern emitting from the central nozzle 68 will form the outside edge of the kill strip. By adjusting this nozzle up or downwardly, the kill strip width can be increased or decreased.

For smaller objects such as new growth or trees, the middle nozzle may be set to the orientation shown in FIG. 12. Here the spray pattern produced by nozzle 68 is substantially vertical, striking the ground surface along a line parallel to the boom. The inward-outward adjustment of the spray pattern may be adjusted as shown to match that of nozzles 67, 69.

Once the desired pattern width has been established, operation may begin. This is accomplished by driving the associated vehicle along a row of objects and on one side thereof. The vehicle is controlled to move along a forward direction of travel with the spray head passing adjacent to the objects around which spray is to be applied. FIGS. 7 through 11 show a sequence of views as the spray head is operated continuously while being moved past an object such as a tree trunk.

Initially, the forwardly angled spray from the forward nozzle 67 will engage the object with a portion of the spray pattern being intercepted by the object and the remainder of the outwardly projecting pattern being sprayed to the inside of the object and beyond the object to the opposite side thereof. The forwardly moving spray head brings the forward nozzle past the object where the spray pattern from the middle nozzle is encountered. The first or forward nozzle continues its spray outwardly, gradually acquiring a full width spray pattern (FIGS. 8, 9) as it moves on forwardly beyond the object.

The triangular spray pattern of the central nozzle will initially project outwardly and forwardly of the object until the object (FIG. 7) is actually encountered by the spray pattern. The spray will be intercepted by the object (FIGS. 8, 9) until forward motion of the vehicle carries the spray boom beyond alignment between the middle nozzle 68 and the object. At this time (FIG. 10) the rearward portions of the central spray pattern will project outwardly of the object and rearwardly thereof.

Figure 11:
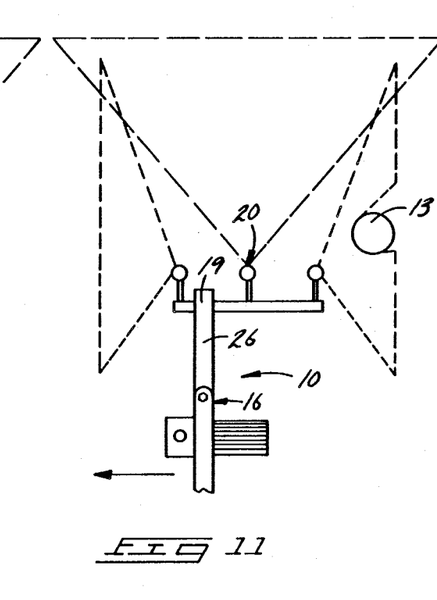

Finally, as shown in FIG. 11, the spray pattern from the rear nozzle 69 is progressively engaged as the spray head is moved by. The spray from this nozzle 69, and from the rearward or trailing portions of the pattern emitted from the middle nozzle 68, is directed to cover the ground surface beyond the object that have not previously been covered by the forward nozzle 67 and forward portions of the middle nozzle pattern.

It may be understood from the above that the spray produced by the present system is directed to both sides of the objects while passing the spray head along a single side of the object. In orchard applications, the vehicle may be moved along a row of trees while the spray is being directed from only one side of the trees but with the system operating to cover a treatment area spread equally to both sides of the trees. This substantially decreases the amount of time required for applying the liquids and assures a relatively uniform application rate since only one pass results in delivery of liquid to both sides of the tree. Furthermore, the low pressure, high volume nature of the nozzles is selected to facilitate greater ground speed with less concern for wind drift. The spray patterns remain constant due to the structural features of the system provided through the parallelogram linkage arrangement and the support provided through the bracket and wheel.

When the spraying operation is completed, the present system can be easily transported simply by lifting the spray boom upwardly to substantially align the lug 51 with the releasable lock 50 (which has been previously lifted along the post to a position above the lug). Once the boom is pivoted to the inoperative, transport condition, the locking lug 51 will align with the locking slot and the lock 50 can be lowered to engage the lug and slot. The boom thus becomes locked in position to enable transport to and from the treatment area.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A vehicle mountable liquid spray system, comprising:
    an elongated spray boom extending from one end adapted to be mounted to a vehicle to a remote end;
    mounting means for supporting the spray boom with the remote end of the spray boom above the ground surface by a prescribed distance;
    wherein the mounting means includes bracket means for mounting the spray boom to a vehicle, and pivot means mounting the boom to the bracket means for movement thereon between an operative position wherein the boom extends outward of the vehicle and is substantially parallel to the ground surface and an inoperative elevated position wherein the boom extends upward from the vehicle;
    means for releasably locking the boom in the inoperative elevated position;
    the spray boom including an inward boom section extending outward from the mounting means;
    an outward boom section;
    parallelogram linkage means interconnecting the inward and outward boom sections for holding the inward and outward sections parallel to one another yet elevationally adjustable relative to one another;
    wherein the mounting means includes a wheel rotatably mounted to the outward boom section;
    a spray head on the boom;
    a plurality of spray nozzles on the spray head;
    means orienting the spray nozzles in selected positions to produce spray patterns projecting outward of the remote boom end in such a manner that liquid being delivered through the spray nozzles may be directed to the ground surface around an upstanding object such as a tree trunk as the boom is moved past the object on one side of the object; and
    a liquid delivery tube connected with the spray head and adapted for connection to a source of liquid, for delivering liquid to the spray nozzles.

2. The liquid spray system of claim 1 wherein the spray nozzles are substantially aligned with one another adjacent the remote boom end along a line transverse to the boom length.

3. The liquid spray system of claim 1 wherein the spray from each spray nozzle is substantially planar and each nozzle is oriented toward the ground surface from the spray head; and
    wherein the spray from each nozzle intersects the ground surface along a substantially straight line of contact and wherein at least two of the nozzles are oriented to produce spray patterns along lines of contact with the ground surface that extend from inward pattern ends inward of the remote boom end to outward pattern ends extending outwardly beyond the remote boom end.

4. The liquid spray system of claim 3 wherein the plurality of nozzles include a central nozzle for producing a pattern along a substantially straight line of contact with the ground surface outward of the boom end that is transverse in relation to the boom.

5. The liquid spray system of claim 1 wherein the means orienting the spray nozzles include nozzle adjusting means enabling selective angular adjustment of the spray nozzles relative to the spray boom.

6. The liquid spray system of claim 1 further comprising:
    an elevation adjusting bracket means at the one boom end for mounting the boom to the vehicle at selected elevations in relation to the ground surface.

7. The liquid spray system of claim 1 further comprising break away means mounting the outward boom section for pivotal movement responsive to impact with an object from a first position wherein the outward and inward boom sections extend substantially along a straight line, to a second position wherein the outward boom section is angularly oriented in a rearward direction relative to the inward boom section; and
    biasing means for yieldably urging the outward boom section to the first position.

8. The liquid spray system of claim 1 further comprising means for selectively locking the parallelogram linkage means rigidly in relation to the outward and inward boom sections.

9. The liquid spray system of claim 1 wherein the nozzles are orificed for low pressure, high volume distribution of liquid in flat patterns and wherein the patterns are substantially triangular, extending beyond the remote boom end.

10. The liquid spray system of claim 9 wherein there are three nozzles, with two of the nozzles facing oppositely and directing their spray patterns, one of which is directed forwardly of the boom and the other of which is directed rearwardly of the boom with respect to a forward direction of travel of the spray boom and with the remaining nozzle directing its spray pattern outwardly beyond the remote boom end and in a plane transverse to the boom length.

11. The liquid spray system of claim 9 wherein there are three nozzles with all three directing their spray patterns in planes substantially parallel to the spray boom and outward of the remote boom end.

12. The liquid spray system of claim 1 wherein the mounting means includes adjusting means selectively operable to set the elevation of the nozzles above the ground surface by a distance approximately between 14 and 18 inches.

13. The liquid spray system of claim 1 wherein the mounting means includes an abutment means for preventing pivotal movement of the spray boom toward the ground surface beyond the operative position.

14. The liquid spray system of claim 13 wherein the mounting means includes elevation adjusting means for selectively adjusting the elevation of the spray boom above the ground surface.

* * * * *